United States Patent
Hanley

(10) Patent No.: US 10,767,040 B2
(45) Date of Patent: Sep. 8, 2020

(54) THERMOSETTING EPOXY RESIN COMPOSITIONS USEFUL AS STRUCTURAL REINFORCEMENT OR STRUCTURAL FOAM

(71) Applicant: SIKA TECHNOLOGY AG, Baar (CH)

(72) Inventor: John Hanley, Sterling Heights, MI (US)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/308,625

(22) PCT Filed: Jun. 20, 2017

(86) PCT No.: PCT/EP2017/065094
§ 371 (c)(1),
(2) Date: Dec. 10, 2018

(87) PCT Pub. No.: WO2017/220583
PCT Pub. Date: Dec. 28, 2017

(65) Prior Publication Data
US 2019/0270879 A1 Sep. 5, 2019

(30) Foreign Application Priority Data

Jun. 20, 2016 (EP) ..................... 16175178

(51) Int. Cl.
| | | |
|---|---|---|
| C08G 59/20 | (2006.01) | |
| C08J 5/00 | (2006.01) | |
| C08J 9/06 | (2006.01) | |
| C08J 9/12 | (2006.01) | |
| B32B 5/18 | (2006.01) | |
| B32B 27/38 | (2006.01) | |
| C08L 63/00 | (2006.01) | |
| C08J 5/24 | (2006.01) | |
| C08J 9/00 | (2006.01) | |
| C08J 9/10 | (2006.01) | |
| C09D 5/00 | (2006.01) | |
| C09D 163/00 | (2006.01) | |
| C08G 59/42 | (2006.01) | |
| C08G 18/48 | (2006.01) | |
| C08J 9/08 | (2006.01) | |
| C09J 163/00 | (2006.01) | |
| C08G 18/73 | (2006.01) | |
| C08G 59/40 | (2006.01) | |
| C08J 9/32 | (2006.01) | |
| C08G 18/10 | (2006.01) | |
| C08G 59/22 | (2006.01) | |

(52) U.S. Cl.
CPC .............. *C08L 63/00* (2013.01); *C08G 18/10* (2013.01); *C08G 18/4854* (2013.01); *C08G 18/73* (2013.01); *C08G 59/4021* (2013.01); *C08G 59/4246* (2013.01); *C08G 59/4253* (2013.01); *C08J 5/24* (2013.01); *C08J 9/0061* (2013.01); *C08J 9/0066* (2013.01); *C08J 9/08* (2013.01); *C08J 9/103* (2013.01); *C08J 9/105* (2013.01); *C08J 9/32* (2013.01); *C09D 5/00* (2013.01); *C09D 163/00* (2013.01); *C09J 163/00* (2013.01); *C08G 59/22* (2013.01); *C08G 59/226* (2013.01); *C08J 2203/02* (2013.01); *C08J 2203/04* (2013.01); *C08J 2203/22* (2013.01); *C08J 2205/10* (2013.01); *C08J 2363/00* (2013.01); *C08J 2363/02* (2013.01); *C08J 2409/00* (2013.01); *C08J 2409/02* (2013.01); *C08J 2463/00* (2013.01); *C08J 2475/04* (2013.01); *C08J 2475/08* (2013.01); *C08L 2203/14* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 6,387,470 B1 | 5/2002 | Chang et al. | |
| 2007/0095475 A1* | 5/2007 | Hable ................ | C08G 59/38 156/330 |
| 2009/0264558 A1 | 10/2009 | Kramer et al. | |
| 2010/0009196 A1 | 1/2010 | Kramer et al. | |
| 2010/0035041 A1 | 2/2010 | Kramer et al. | |

FOREIGN PATENT DOCUMENTS

| | | | |
|---|---|---|---|
| EP | 1 916 269 A1 | 4/2008 | |
| EP | 1 916 272 A1 | 4/2008 | |
| EP | 2 182 025 A1 | 5/2010 | |

OTHER PUBLICATIONS

Jul. 20, 2017 Search Report issued in International Patent Application No. PCT/EP2017/065094.
Jul. 20, 2017 Written Opinion issued in International Patent Application No. PCT/EP2017/065094.

* cited by examiner

*Primary Examiner* — Michael J Feely
(74) *Attorney, Agent, or Firm* — Oliff PLC

(57) ABSTRACT

Thermosetting epoxy resin compositions on the one hand at room temperature in the incompletely cured state exhibit extremely slight alteration in shape and on the other hand develop a high surface tack, and, moreover, in the fully cured state are of high impact strength and at the same time exhibits high adhesion, particularly to metallic substrates. These compositions are ideally suited to the production of self-adhesive reinforcing elements.

20 Claims, No Drawings

THERMOSETTING EPOXY RESIN COMPOSITIONS USEFUL AS STRUCTURAL REINFORCEMENT OR STRUCTURAL FOAM

TECHNICAL FIELD

The present invention relates to the field of thermosetting epoxy resin compositions, and more particularly to use thereof as structural reinforcements and structural foams.

PRIOR ART

Thermosetting epoxy resin compositions have been in use for some considerable time as adhesives in body shell construction and also in reinforcing elements or structural foams.

Known thermosetting epoxy resin adhesives, especially from high-impact epoxy resin adhesives, are typically liquid or at least pastelike at room temperature. This is a disadvantage if the composition is to be stored in dimensionally stable form as a three-dimensional article, especially in reinforcing elements for the reinforcement of structural components, until it is used and subsequently cured to completion.

Besides the requirement that the article does not change its shape when stored in the incompletely cured state, there is a need for such articles to have sufficient tack to allow them to be mounted self-adhesively onto a substrate. There is therefore a great desire for thermosetting epoxy resin compositions having a solid aggregate state at room temperature and exhibiting a tacky surface at room temperature.

Reinforcing elements which comprise a thermosetting epoxy resin composition and which on exposure to heat result in a structural foam are known for example under the SikaReinforcer® trade name. U.S. Pat. No. 6,387,470 B1 discloses for example a thermosetting, foamable sealant that is non-tacky at room temperature which comprises a mixture of liquid epoxy resin in the presence of a thermoplastic such as polystyrene and a thermoplastic elastomer such as SBS block copolymer.

SUMMARY OF THE INVENTION

It is therefore one of objects of the present invention to provide a thermosetting epoxy resin composition which on the one hand at room temperature in the incompletely cured state exhibits extremely slight alteration in shape and on the other hand develops a high surface tack, and which, moreover, in the fully cured state is of high impact strength and at the same time exhibits high adhesion, particularly to metallic substrates.

It has surprisingly emerged that this object can be achieved by the thermosetting epoxy resin composition according to Claim 1.

If these compositions include a blowing agent, these thermosetting compositions are suitable for producing foams. These foams are ideally suited to be reinforcement of structures.

On account of the feature that the thermosetting epoxy resin compositions exhibit very little alteration in shape at room temperature and possess a high surface tack, they are ideally suited to the production of self-adhesive reinforcing elements. Such reinforcing elements are dimensionally stable at room temperature and readily storable. It was further found that the mentioned thermosetting epoxy resin compositions can be welded through and not affect existing welding operations during for example a vehicle assembly.

Further aspects of the present invention are subjects of further independent claims. Particularly preferred embodiments are subjects of the dependent claims.

The thermosetting epoxy resin compositions may be employed particularly for reinforcement/stiffening at locations which are not accessible to welding instruments/robots during assembly, owing for example to inaccessibility/narrow confines.

Because of the surface tack of the thermosetting epoxy resin compositions, these three-dimensional articles during assembly can be mounted easily, by hand for example, at inaccessible locations, where their dimensional stability and surface tack allow them to remain until being fully cured by elevated temperature.

EMBODIMENTS OF THE INVENTION

The present invention relates in a first aspect to a thermosetting epoxy resin composition. This thermosetting epoxy resin composition comprises 17.5-30 weight %, more particularly 20-30 weight %, of at least one liquid epoxy resin A having on average more than one epoxide group per molecule;
1-5 weight %, more particularly 2-4 weight %, of at least one hardener B for epoxy resins which is activated by elevated temperature;
0-2 weight % of at least one accelerator C;
5-12 weight %, more particularly 7-11 weight %, of at least one polymeric impact modifier D, which is a terminally blocked polyurethane prepolymer;
0-5 weight %, more particularly 1-3 weight %, of at least one polyisoprene E;
5-10 weight %, more particularly 5-8 weight %, of at least one carboxyl- or epoxide-terminated acrylonitrile/butadiene copolymer F which is liquid at room temperature;
15-20 weight %, of at least one carboxyl- or epoxide-terminated acrylonitrile/butadiene copolymer G which is solid at room temperature; based on the total weight of the epoxy resin composition.

For the purposes of this invention, organic substances which are "solid at room temperature" have a glass transition temperature which lies above room temperature. The glass transition temperature in this context is determined by means of DSC (differential scanning calorimetry).

"Room temperature" refers in this document to a temperature of 23° C.

The term "average molecular weight" refers here to the numerical average of the molecular weight, as determined by GPC analysis (gel permeation chromatography) with respect to polystyrene standard.

In this document, the use of the term "independently from one another" in connection with substituents, residues or groups is to be interpreted to mean that in the same molecule the identically designated substituents, residues or groups may occur simultaneously with different definitions.

Throughout the present specification, the prefix "poly" as for example in "polyisocyanate", "polyamine", "polyol", "polyphenol", and "polymercaptan" identifies molecules which formally contain two or more of the functional groups in question.

An "impact modifier" in this document means an organic polymer addition to an epoxy resin matrix which even at low levels of addition, i.e. typically between 0.1 and 20 weight %, brings about a significant increase in the strength and is therefore capable of accommodating greater impact stress or jolting stress before the matrix tears or ruptures.

The dashed lines in the formulae in this document represent in each case the bond between the substituent in question and the remainder of the associated molecule.

The term "polymer" in the present document encompasses on the one hand a collective of chemically uniform macromolecules which nevertheless differ in terms of degree of polymerization, molar mass and chain length, the collective having been prepared by a polymerization reaction (chain-growth addition polymerization, polyaddition, polycondensation). The term, on the other hand, also encompasses derivatives of such a collective of macromolecules from polymerization reactions, in other words compounds which have been obtained by means of reactions, such as additions or substitutions, for example, of functional groups on existing macromolecules, and which may be chemically uniform or chemically non-uniform. The term also encompasses, furthermore, what are known as prepolymers, by which are meant reactive oligomeric pre-adducts whose functional groups take part in the construction of macromolecules.

The term "polyurethane polymer" encompasses all polymers which are prepared by the process known as the diisocyanate polyaddition process. This also includes those polymers which are entirely or virtually free from urethane groups. Examples of polyurethane polymers are polyether-polyurethanes, polyester-polyurethanes, polyether-polyureas, polyureas, polyester-polyureas, polyisocyanurates and polycarbodiimides.

A "vehicle" or "means of transport" for this document is any means of locomotion on water, on land and in the air. Included in particular are boats, wheeled vehicles such as cars, buses, coaches, lorries, and also rail vehicles such as trams and trains.

The thermosetting epoxide composition preferably exhibits extremely slight alteration in shape at 23° C., meaning that it has in particular a viscosity of 5 000-50 000 Pa·s, more particularly 7 000-25 000 Pa·s, most preferably 8 000-16 000 Pa·s, at 30° C. The viscosity here is determined oscillographically by means of a rheometer having a heatable plate (MCR 201, Anton Paar) (1000 μm gap, measuring plate diameter: 25 mm (plate/plate), deformation 0.01 at 5 Hz, temperature: 30° C.). The viscosity is indicated at 30° C. since a measurement with the method described before is difficult at 23° C. for the thermosetting epoxide composition.

The thermosetting epoxy resin composition preferably has a viscosity between 900-5000 Pa·s, more preferably between 1000-4000 Pa·s, even more preferably 1500-4000 Pa·s, most preferred between 2000-4000 Pa·s, at 80° C. The viscosity here is determined by the same method described in the aforementioned paragraph. A viscosity of this level is favourable to dimensional stability.

The thermosetting epoxy resin composition is preferably tacky at room temperature. The term "tacky" in this context refers throughout the present document to a surface tack in the sense of instantaneous adhesion or stickiness that is sufficient at room temperature so that, when pressed with a thumb, exerting a pressure of 5 kg for 1 second on the surface of the thermosetting epoxy resin composition, the thumb remains sticking to the surface of the thermosetting epoxy resin composition. Preferably in this way, after the surface of the thermosetting epoxy resin composition has been pressed with a thumb, exerting a pressure of 5 kg for 1 second, a thermosetting epoxy resin composition having an intrinsic weight of 50 g can be lifted up for at least 5 seconds.

Liquid Epoxy Resin A

The thermosetting epoxy resin composition comprises at least one liquid epoxy resin A having on average more than one epoxide group per molecule. Preferred liquid epoxy resins A having on average more than one epoxide group per molecule have the formula (VI)

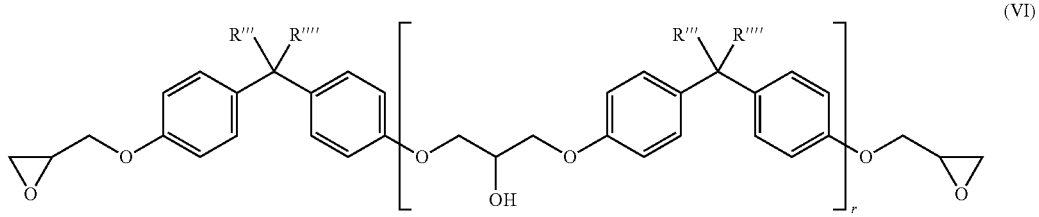

(VI)

In this formula the substituents R''' and R'''' independently of one another are either H or CH$_3$. Moreover, the index r is from 0 to 1. Preferably r is less than 0.2.

The resins in question are therefore preferably diglycidyl ethers of bisphenol-A (DGEBA), of bisphenol-F, and of bisphenol-NF. Liquid resins of these kinds are available for example as Araldite® GY 250, Araldite® PY 304, Araldite® GY 282 (Huntsman) or D.E.R.™ 331 or D.E.R.™ 330 (Dow) or Epikote 828 (Hexion).

Additionally suitable as liquid epoxy resins A are what are called novolaks. These resins have in particular the following formula:

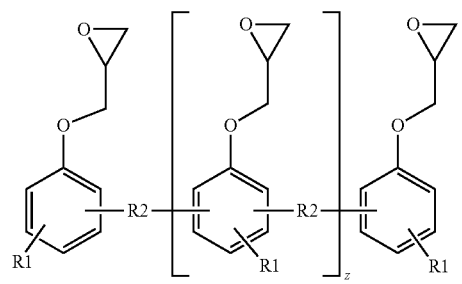

where

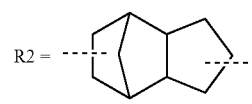

or CH$_2$, R1=H or methyl and z=0 to 7.

More particularly these are phenol or cresol novolaks (R2=CH$_2$).

Epoxy resins of these kinds are available commercially under the trade name EPN or ECN and also Tactix®556 from Huntsman, or among the D.E.N.™ product series from Dow Chemical.

The fraction of liquid epoxy resins A is 17.5-30 weight %, more particularly 20-30 weight %, based on the total weight of the thermosetting epoxy resin composition.

In contrast to the liquid epoxy resins A, solid epoxy resins having on average more than one epoxide group per molecule are solid at room temperature. The glass transition temperature of solid resins is above room temperature, meaning that they can be comminuted to pourable powders at room temperature.

Hardener B

The thermosetting epoxy resin composition further comprises at least one hardener B for epoxy resins that is activated by elevated temperature.

The heat-activatable hardener B is selected more particularly from the group consisting of dicyandiamides, guanamines, guanidines, aminoguanidines and derivatives thereof, and also imidazoles, imidazole salts, imidazolines and amine complexes.

This heat-activatable hardener B can be activated more particularly at a temperature of 100-220° C., more particularly of 120-200° C., preferably between 160 and 190° C.

A particularly preferred hardener B is dicyandiamide.

The total fraction of the hardener B is 1-5 weight %, more particularly 2-4 weight %, based on the total weight of the thermosetting epoxy resin composition.

Accelerator C

The thermosetting epoxy resin composition further comprises 0-2 weight % of at least one accelerator C. The figures are based on the total weight of the thermosetting epoxy resin composition.

Preferred accelerators C are substituted ureas, selected more particularly from the list consisting of 3-(3-chloro-4-methylphenyl)-1,1-dimethylurea (chlortoluron), p-chlorophenyl-N,N-dimethylurea (monuron), 3-phenyl-1,1-dimethylurea (fenuron), 3,4-dichlorophenyl-N,N-dimethylurea (diuron), N,N-dimethylurea, N-isobutyl-N',N'-dimethylurea and 1,1'-(hexane -1,6-diyl)bis(3,3'-dimethylurea).

N,N-Dimethylurea is particularly preferred.

The amount of the accelerator C is advantageously 0.01-2.0 weight %, more particularly 0.01-1.0 weight %, based on the total weight of the thermosetting epoxy resin composition.

It may further be advantageous if the fraction of accelerator C is 0.01-0.1 weight %, based on the total weight of the thermosetting epoxy resin composition. This is conducive to high values for LSS LB. This is evident for example in examples Ex. 7 and Ex. 11.

It may further be advantageous if the fraction of accelerator C is 0.3-0.5 weight %, based on the total weight of the thermosetting epoxy resin composition. This is conducive to high values for LSS LB in conjunction with high values for LSS HB. This is evident for example in examples Ex. 7 and Ex. 14.

With particular advantage the fraction of accelerator C is 0.3-0.5 weight % and the fraction of blowing agent H is 0.01-0.1 weight %, both based on the total weight of the thermosetting epoxy resin composition. This is particularly conducive to high values for LSS HB. This is evident for example in example Ex.10.

Impact Modifier D

The thermosetting epoxy resin composition further comprises 5-12 weight %, more particularly 7-11 weight %, of at least one polymeric impact modifier D, which is a terminally blocked polyurethane prepolymer. The figures are based on the total weight of the thermosetting epoxy resin composition.

The impact modifier D is preferably a terminally blocked polyurethane prepolymer of the formula (I)

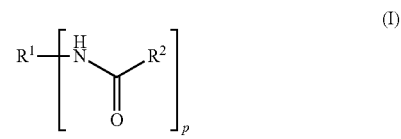

In this formula $R^1$ is a p-valent residue of a linear or branched polyurethane prepolymer PU1, terminated by isocyanate groups, following the removal of the terminal isocyanate groups, and p is from 2 to 8.

Furthermore, $R^2$ independently at each occurrence is a substituent selected from the group consisting of

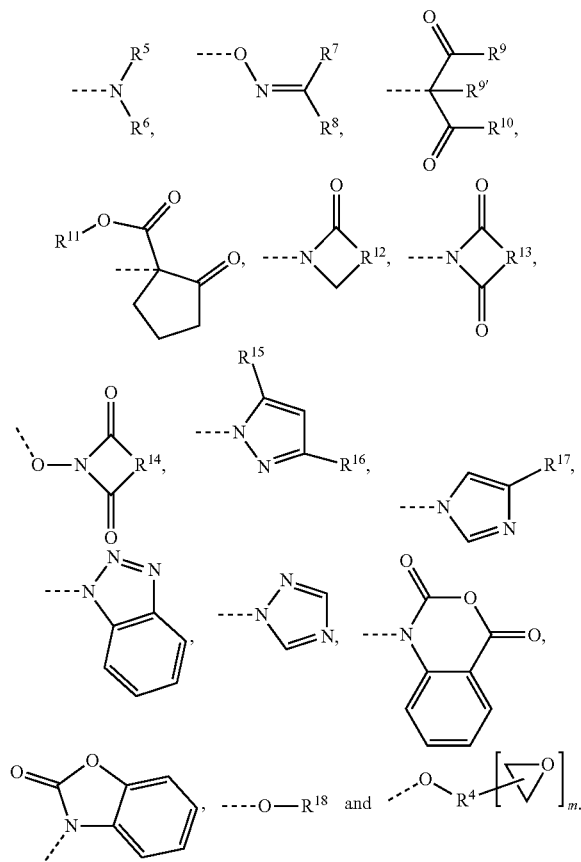

In these formulae $R^5$, $R^6$, $R^7$ and $R^8$ each independently of one another are an alkyl or cycloalkyl or aralkyl or arylalkyl group, or $R^5$ together with $R^6$, or $R^7$ together with $R^8$, forms part of a 4- to 7-membered ring which is optionally substituted.

Furthermore, $R^9$, $R^{9'}$ and $R^{10}$ each independently of one another are an alkyl or aralkyl or arylalkyl group or are an alkyloxy or aryloxy or aralkyloxy group and $R^{11}$ is an alkyl group.

$R^{12}$, $R^{13}$ and $R^{14}$ each independently of one another are an alkylene group having 2 to 5 C atoms which optionally has double bonds or is substituted, or are a phenylene group or are a hydrogenated phenylene group.

$R^{15}$, $R^{16}$ and $R^{17}$ each independently of one another are H or are an alkyl group or are an aryl group or an aralkyl group and $R^{18}$ is an aralkyl group or is a mono- or polycyclic, substituted or unsubstituted aromatic group which optionally has aromatic hydroxyl groups.

Finally $R^4$ is a residue of an aliphatic, cycloaliphatic, aromatic or araliphatic epoxide containing a primary or secondary hydroxyl group, following the removal of the hydroxide and epoxide groups, and m is 1, 2 or 3.

Residues for consideration as $R^{18}$ include in particular, on the one hand, phenols or polyphenols, especially bisphenols, following removal of a hydroxyl group. Preferred examples of such phenols and bisphenols are, in particular phenol, cresol, resorcinol, pyrocatechol, cardanol (3-pentadecenylphenol (from cashewnut shell oil)), nonylphenol, phenols reacted with styrene or with dicyclopentadiene, bisphenol A, bisphenol F and 2,2'-diallylbisphenol A.

Residues for contemplation as $R^{18}$ are on the other hand, in particular, hydroxybenzyl alcohol and benzyl alcohol following removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, this group is more particularly a linear or branched $C_1$-$C_{20}$ alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, this moiety is more particularly an aromatic group, which is bonded via methylene, and more particularly is a benzyl group.

If $R^5$, $R^6$, $R^7$, $R^8$, $R^9$, $R^{9'}$ or $R^{10}$ is an alkylaryl group, this group more particularly is a $C_1$ to $C_{20}$ alkyl group which is bonded via phenylene, such as a tolyl or xylyl group, for example.

The residues $R^2$ are preferably the substituents of the formulae

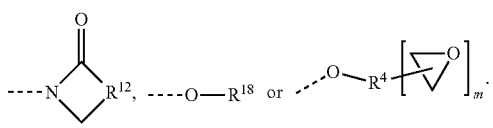

A preferred substituent of the formula

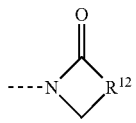

is ε-caprolactam following removal of the NH proton.

A preferred substituent of the formula —O—$R^{18}$ are monophenols or polyphenols, more particularly monophenols or bisphenols, following removal of a phenolic hydrogen atom. Particularly preferred examples of such residues $R^2$ are residues selected from the group consisting of

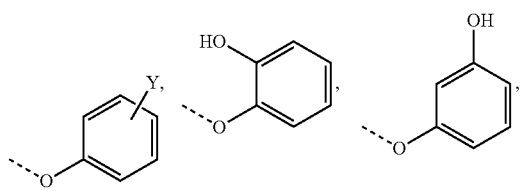

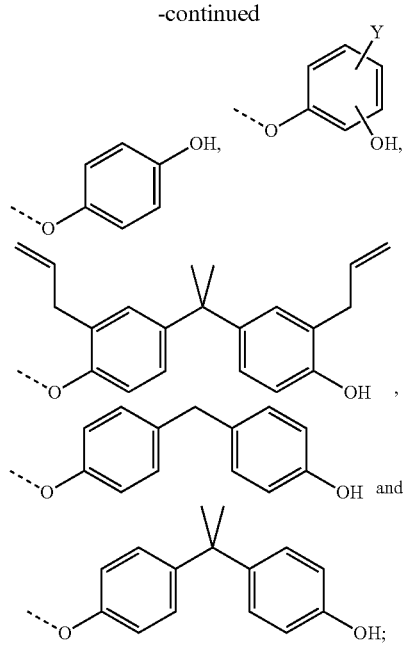

The residue Y here is a saturated or olefinic unsaturated hydrocarbon residue having 1 to 20 C atoms, more particularly having 1 to 15 C atoms. Preferred as Y in particular are allyl, methyl, nonyl, dodecyl or an unsaturated $C_{15}$ alkyl radical having 1 to 3 double bonds.

The terminally capped polyurethane prepolymer of the formula (I) is prepared from the isocyanate-terminated linear or branched polyurethane prepolymers PU1 with one or more isocyanate-reactive compounds $R^2H$. If a plurality of such isocyanate-reactive compounds are used, the reaction can be effected sequentially or with a mixture of these compounds.

The reaction is effected in such a way that the one isocyanate-reactive compound or the plurality of isocyanate-reactive compounds $R^2H$ is/are used stoichiometrically or in a stoichiometric excess, in order to ensure that all NCO groups are converted.

The polyurethane prepolymer PU1 on which $R^1$ is based can be prepared from at least one diisocyanate or triisocyanate and from a polymer $Q_{PM}$ with terminal amino, thiol or hydroxyl groups.

Suitable diisocyanates are aliphatic, cycloaliphatic, aromatic or araliphatic diisocyanates, especially commercial products such as methylenediphenyl diisocyanate (MDI), hexamethylene diisocyanate (HDI), tolylene diisocyanate (TDI), toluidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), etc., and the dimers thereof. Preference is given to HDI, IPDI, MDI or TDI.

Suitable triisocyanates are trimers or biurets of aliphatic, cycloaliphatic, aromatic or araliphatic diisocyanates, especially the isocyanurates and biurets of the diisocyanates described in the preceding paragraph.

It will be appreciated that it is also possible to use suitable mixtures of di- or triisocyanates.

Especially suitable polymers $Q_{PM}$ with terminal amino, thiol or hydroxyl groups are polymers $Q_{PM}$ with two or three terminal amino, thiol or hydroxyl groups.

The polymers $Q_{PM}$ advantageously have an equivalent weight of 300-6000, especially of 600-4000 and especially of 700-2200 g/equivalent of NCO-reactive groups.

The polymers $Q_{PM}$ are advantageously difunctional or higher-functionality polyols with OH equivalent weights of 300 to 6000 g/OH equivalent, especially of 600 to 4000 g/OH equivalent, preferably 700-2200 g/OH equivalent. Also advantageously, the polyols are selected from the group consisting of polyethylene glycols, polypropylene glycols, polyethylene glycol-polypropylene glycol block copolymers, polybutylene glycols, hydroxyl-terminated polybutadienes, hydroxyl-terminated butadiene/acrylonitrile copolymers, hydroxyl-terminated synthetic rubbers, the hydrogenation products thereof and mixtures of these said polyols.

In addition, the polymers $Q_{PM}$ used may also be difunctional or higher-functionality amino-terminated polyethylene ethers, propylene ethers, as sold, for example, under the Jeffamine® name by Huntsman, polybutylene ethers, polybutadienes, butadiene/acrylonitrile copolymers, as sold, for example, under the Hycar® ATBN name by Nanoresins AG, Germany, and further amino-terminated synthetic rubbers or mixtures of the components mentioned.

Preferred polymers $Q_{PM}$ are polyols with average molecular weights between 600 and 6000 g/mol, selected from the group consisting of polyethylene glycols, polypropylene glycols, polyethylene glycol-polypropylene glycol block polymers, polybutylene glycols, hydroxyl-terminated polybutadienes, hydroxylterminated butadiene-acrylonitrile copolymers and mixtures thereof.

Especially preferred polymers $Q_{PM}$ are α,ω-dihydroxypolyalkylene glycols with $C_2$-$C_6$-alkylene groups or with mixed $C_2$-$C_6$-alkylene groups terminated with amino, thiol or preferably hydroxyl groups. Particular preference is given to polypropylene glycols or polybutylene glycols. Also particularly preferred are hydroxyl-terminated polyoxybutylenes.

To a person skilled in the art it is clear that of course mixtures of impact modifiers D may also be used.

Polyisoprene E

The thermosetting epoxy resin composition further comprises 0-5 weight %, more particularly 1-3 weight %, of at least one polyisoprene E. The figures are based on the total weight of the thermosetting epoxy resin composition.

It is preferably an isoprene homopolymer.

It is further advantageous if the polyisoprene is a polyisoprene which is liquid at room temperature.

The polyisoprene preferably has an average molecular weight of 8000-80 000 g/mol, more particularly of 20 000-80 000 g/mol, especially preferably of 40 000-60 000 g/mol.

Possible polyisoprenes are available commercially as LIR-30 or LIR-50 from Kuraray Co. Ltd, Tokyo, for example.

Carboxyl- or Epoxide-Terminated Acrylonitrile/Butadiene Copolymer F Liquid at Room Temperature The thermosetting epoxy resin composition further comprises 5-10 weight %, more particularly 5-8 weight %, of at least one carboxyl- or epoxide-terminated acrylonitrile/butadiene copolymer F which is liquid at room temperature. The figures are based on the total weight of the thermosetting epoxy resin composition.

Carboxyl- or epoxide-terminated acrylonitrile/butadiene copolymers of this kind are available commercially for example under the name Hypro™ (formerly Hycar®) CTBN and ETBN or under the name HyPox™ such as, for example, HyPoxTMRA1340 or HyPox™ RA840 from Emerald Performance Materials LLC.

Alternatively the acrylonitrile/butadiene copolymer F may also represent a carboxyl- or epoxide-terminated acrylonitrile/butadiene copolymer which has been pre-extended or reacted with polyepoxides or polyphenol. With particular preference these are what are called epoxy resin-modified acrylonitrile/butadiene copolymers. Particularly suitable as modified acrylonitrile/butadiene copolymers are those liquid rubbers of the kinds sold commercially under the Polydis® product line; preferably from the Polydis® 36 product line, by Struktol® (Schill+Seilacher Gruppe, Germany); or under the product line Albipox (Evonik Hanse, Germany).

Preferred are epoxide-terminated acrylonitrile/butadiene copolymers, more particularly acrylonitrile/butadiene copolymers reacted with bisphenol A diglycidyl ether or bisphenol F diglycidyl ether.

The copolymer in question is preferably an epoxide-terminated acrylonitrile/butadiene copolymer having an elastomer fraction of 35-45 weight %. This is conducive to a greater tack on the part of the composition.

More preferably it is an epoxide-terminated acrylonitrile/butadiene copolymer having a viscosity of 20-500 Pa·s, more particularly of 150-250 Pa·s at 25° C. This too is conducive to greater tack on the part of the composition.

More preferably it is an epoxide-terminated acrylonitrile/butadiene copolymer having an epoxy equivalent weight (EEW) of 200-400, more particularly of 300-400. This too is conducive to greater tack on the part of the composition.

Carboxyl- or Epoxide-Terminated Acrylonitrile/Butadiene Copolymer G Solid at Room Temperature The thermosetting epoxy resin composition further comprises 15-20 weight % of at least one carboxyl- or epoxide-terminated acrylonitrile/butadiene copolymer G which is solid at room temperature. The figures are based on the total weight of the thermosetting epoxy resin composition.

Carboxyl- or epoxide-terminated acrylonitrile/butadiene copolymers of this kind are available commercially for example under the name Hypro™ (formerly Hycar®) CTBN and ETBN or under the name HyPox™ such as, for example, HyPox™ RK84L or HyPox™ RK820 from Emerald Performance Materials LLC.

Alternatively the acrylonitrile/butadiene copolymer G may also represent a carboxyl- or epoxide-terminated acrylonitrile/butadiene copolymer which has been pre-extended or reacted with polyepoxides or polyphenol. With particular preference these are what are called epoxy resin-modified acrylonitrile/butadiene copolymers.

Preferred are epoxide-terminated acrylonitrile/butadiene copolymers, more particularly acrylonitrile/butadiene copolymers reacted with bisphenol A-based solid resins or bisphenol F-based solid resins.

The copolymer in question is preferably an epoxide-terminated acrylonitrile/butadiene copolymer having an elastomer fraction of 25-35 weight %. This is conducive to greater tack on the part of the composition.

More preferably it is an epoxide-terminated acrylonitrile/butadiene copolymer having an epoxy equivalent weight (EEW) of 900-1600, more particularly of 1200-1600. This too is conducive to greater tack on the part of the composition.

Blowing Agent H

The thermosetting epoxy resin composition preferably further comprises at least one physical or chemical blowing agent H, more particularly in an amount of 0.1-3 weight %, based on the total weight of the epoxy resin composition.

Preferred blowing agents are chemical blowing agents which release a gas on heating, more particularly to a temperature of 100 to 200° C. These may be exothermic blowing agents, such as azo compounds, hydrazine derivatives, semicarbazide or tetrazoles, for example. Preferred are azodicarbonamide and oxybis(benzenesulfonylhydrazide), which release energy on decomposition. Also suitable, moreover, are endothermic blowing agents, such as sodium bicarbonate/citric acid mixtures, for example. Chemical blowing agents of these kinds are available for example under the name Celogen™ from Chemtura. Likewise suitable are physical blowing agents, of the kinds sold under the trade name Expancel™ by Akzo Nobel.

Particularly suitable blowing agents are those of the kind available under the trade name Expancel™ from Akzo Nobel or Celogen™ from Chemtura.

Furthermore, the composition preferably further comprises at least one filler. Preferably this comprises mica, talc, kaolin, wollastonite, feldspar, syenite, chlorite, bentonite, montmorillonite, calcium carbonate (precipitated or ground), dolomite, quartz, silicas (pyrogenic or precipitated), cristobalite, calcium oxide, aluminium hydroxide, magnesium oxide, hollow ceramic beads, hollow glass beads, hollow organic beads, glass beads, colour pigments.

Particularly preferred fillers are selected from the list consisting of silicas (pyrogenic or precipitated), calcium oxide, calcium carbonate (precipitated or ground) and aluminium hydroxide. It can further be preferred if both, precipitated and ground calcium carbonate are present. It was surprisingly found that this leads to an increased capability to absorb oil from oiled surfaces, beneficial thixotropic behaviour at low cost in the present invention.

The total fraction of the entire filler advantageously is 15-55 weight %, preferably 30-50 weight %, more particularly 35-45 weight %, based on the weight of the overall composition.

One particularly preferred thermosetting epoxy resin composition comprises
  17.5-30 weight %, more particularly 20-30 weight %, of at least one liquid epoxy resin A having on average more than one epoxide group per molecule;
  1-5 weight %, more particularly 2-4 weight %, of at least one hardener B for epoxy resins which is activated by elevated temperature;
  0-2 weight % of at least one accelerator C;
  5-12 weight %, more particularly 7-11 weight %, of at least one polymeric impact modifier D, which is a terminally blocked polyurethane prepolymer;
  0-5 weight %, more particularly 1-3 weight %, of at least one polyisoprene E;
  5-10 weight %, more particularly 5-8 weight %, of at least one carboxyl- or epoxide-terminated acrylonitrile/butadiene copolymer F which is liquid at room temperature;
  15-20 weight %, of at least one carboxyl- or epoxide-terminated acrylonitrile/butadiene copolymer G which is solid at room temperature;
  preferably 0.1-3 weight % of at least one physical or chemical blowing agent H, more particularly in an amount of 0.1-3 weight %;
  preferably 15-55 weight %, more preferably 30-50 weight %, more particularly 35-45 weight %, of at least one aforementioned filler,
based on the total weight of the epoxy resin composition.

It may further be advantageous if this composition further comprises at least one physical or chemical blowing agent H, more particularly in an amount of 0.1-3 weight %, based on the total weight of the epoxy resin composition. It may, however, also be advantageous if the composition is free from physical or chemical blowing agents H.

This preferred thermosetting epoxy resin composition is composed preferably to an extent of more than 90 weight %, more particularly more than 96 weight %, especially preferably more than 98 weight % of the aforementioned constituents, based on the total weight of the epoxy resin composition.

The composition may comprise further constituents, especially stabilizers, more particularly heat and/or light stabilizers, thixotropic agents, plasticizers, solvents, dyes and pigments, corrosion inhibitors, adhesion promoters and flame retardants.

Particularly suitable stabilizers are optionally substituted phenols, such as butylated hydroxytoluene (BHT) or Wingstay® T (Elikem), sterically hindered amines or N-oxyl compounds such as TEMPO (Evonik).

The total fraction of the aforesaid further constituents is advantageously 0.1-5 weight %, preferably 0.2-3 weight %, more particularly 0.5-1.5 weight %, based on the total weight of the epoxy resin composition.

The thermosetting epoxy resin composition, not fully cured, preferably exhibits extremely slight alteration in shape at 23° C. On heating, the epoxy resin composition becomes plastic and can easily be reshaped. Customary shaping methods for obtaining an article having a three-dimensional extent are, in particular, extrusion, die-cutting, and calendering, preferably extrusion. To a person skilled in the art it is clear that for shaping at elevated temperature, the temperature must be below the activation temperature for the hardener B in order to prevent premature unwanted reaction. It is therefore preferred for any shaping operations to take place at a temperature at least 20° C. below the activation temperature of the hardener B. The shaping temperature is situated typically at between 50 and 110° C.

After full curing at a temperature above the activation temperature of the hardener B, the thermosetting epoxy resin compositions described are distinguished by high impact strength and effective adhesion to substrates, especially to metallic substrates.

Thermosetting epoxy resin compositions of this kind are needed particularly for the reinforcing of heat-stable materials, more particularly of structural components. Heat-stable materials are materials which at a curing temperature of 100-220° C., preferably 150-210° C., are dimensionally stable at least during the cure time. More particularly they are metals and plastics such as ABS, polyamide, polyphenylene ether, composite materials such as SMC, unsaturated polyester GRP, composite epoxide materials or composite acrylate materials. Particularly heat-stable plastics are additionally poly(phenylene ether), polysulfones or polyether sulfones.

In a preferred application, the at least one material is a metal. More particularly the metal is a metal which has been coated by cathodic electrodeposition (CED).

A particularly preferred use is the reinforcing of metals, especially in body shell construction in the automotive industry. The preferred metals are, in particular, steel, especially electrolytically galvanized, hot-dip galvanized, oiled steel, Bonazinc-coated steel, and subsequently phosphatized steel, and also aluminium, particularly in the versions typically encountered in car making.

Such thermosetting epoxy resin compositions are in particular first contacted with the materials to be reinforced, more particularly structural components, at a temperature of between 10° C. and 80° C., more particularly between 10°

C. and 60° C., and are later cured to completion at a temperature of typically 100-220° C., preferably 150-210° C.

A further aspect of the present invention therefore relates to a method for reinforcing outer surfaces or cavities of structural components, comprising the steps of
i) placing a thermosetting epoxy resin composition as described in detail above onto outer surfaces or into cavities of structural components;
ii) heating the thermosetting epoxy resin composition to a temperature of 100-220° C., more particularly of 150-210° C., preferably of 160 and 205° C.

The result of a method of this kind for reinforcing outer surfaces or cavities of structural components is a reinforced article. An article of this kind is preferably a vehicle or an ancillary vehicle component.

A further aspect of the present invention therefore relates to a reinforced article obtained from the aforesaid method. An article of this kind is preferably a vehicle or an ancillary vehicle component.

Furthermore, the compositions of the invention are suitable not only for automotive construction but also for other areas of application. Particularly noteworthy are related applications in transport construction such as boats, lorries, buses or rail vehicles, or in the building of consumer goods such as washing machines, for example.

The materials reinforced by means of a composition of the invention are employed at temperatures between typically 120° C. and −40° C., preferably between 100° C. and −40° C., more particularly between 80° C. and −40° C.

A further aspect of the invention is therefore the use of the thermosetting epoxy resin composition of the invention for reinforcing heat-stable materials, more particularly structural components.

Particular preference is given to the use for reinforcing outer surfaces or cavities, more particularly for the reinforcing filling of cavities, in structural components, preferably in vehicle construction or sandwich panel construction.

The thermosetting epoxy resin composition may preferably be applied without additional parts, such as a support as stated below, for example, to a substrate, more particularly to a structural component.

The thermosetting epoxy resin composition may be present in the form of article having a three-dimensional extent, more preferably present in a sheet-like form, more particularly in the form of strips or sheets or patches, and may be applied in that form.

Hence a further aspect of the present invention therefore relates to an article having a three-dimensional extent, more preferably having a sheet-like form, more particularly being in the form of a strip or a sheet or a patch comprising, preferably consisting of, a thermosetting epoxy resin composition as described above.

Preferably, as strips, these articles are 20-500 mm, more preferred 50-250 mm, in length, 2-15 mm, more preferred 5-10 mm, in width and 0.5-5 mm, more preferred 1-3 mm, in thickness.

Preferably, as patches, these articles are 20-500 mm in length and in width and 0.5-5 mm, more preferred 1-3 mm, in thickness.

It may, however, also be possible if the thermosetting epoxy resin composition is applied to a support and if the article having a three-dimensional extent takes the form of a combination of thermosetting epoxy resin composition and support. Supports of this kind are composed in particular of a heat-stable material, as already mentioned above as heat-stable materials. The thermosetting epoxy resin composition in this case is applied in the melted state to the support. It is further preferred, if the surface of the carrier is surrounded to more than 50%, preferably more than 75%, most preferably to more than 90% with the thermosetting epoxy resin composition. This safeguards to good adhesions with the substrates to be bonded.

It is therefore easily possible to produce reinforcing elements with a support bearing an applied thermosetting epoxy resin composition as described, for the reinforcing of heat-stable materials, more particularly structural components.

These supports may consist of any desired materials. Preferred materials are plastics, especially polyurethanes, polyamides, polyester and polyolefins, preferably polymers of high temperature stability such as poly(phenylene ethers), polysulfones or polyethersulfones; metals, more particularly aluminium and steel; or any desired combinations of these materials.

The support may preferably also be a fibre material. Suitable fibre materials are those composed of high-strength fibres such as glass fibres, carbon fibres, metal fibres, especially steel fibres, polymer fibres, especially aramid fibres, and ceramic fibres, for example. Glass fibres and carbon fibres are especially suitable.

More particularly a support of this kind is in the form of strips or sheets.

These reinforcing elements are fixed on the metallic structure to be reinforced or are fixed into a cavity in the metallic structure to be reinforced. The fixing is accomplished preferably by pressing the surface of the thermosetting epoxy resin composition onto the substrate, where it remains joined to the substrate by virtue of the possibly sufficient surface tack of the thermosetting epoxy resin composition.

Fixing, alternatively, may also be accomplished using a fixing means such as a clip, a screw, a hook, a rivet, a screw, a groove or an adhesive, or may be accomplished by appropriate geometry of the structure, permitting clamped engagement. Preferably, the reinforcing elements are free of the before mentioned fixing means.

A further aspect of the present invention therefore relates to a fully cured epoxy resin composition which is obtained by heating a thermosetting epoxy resin composition, as described in detail above, to a temperature of 100-220° C., preferably 150-210° C.

In particular, a further aspect of the present invention relates to a structural foam obtained by heating from a thermosetting epoxy resin composition as already described. To a person skilled in the art it is clear that in order to form a structural foam, the thermosetting epoxy resin composition requires a physical or chemical blowing agent H, more particularly in an amount of 0.1-3 weight %, based on the total weight of the epoxy resin composition, as a constituent of the composition. These particularly preferred thermosetting epoxy resin compositions have likewise already been described in detail above.

The key qualities of a structural foam are on the one hand that it is foamed up in the course of heating, and on the other hand that by virtue of the full chemical curing of the composition it is capable of transmitting large forces and therefore of reinforcing a structure, particularly a structural component.

They may be mounted, for example, in the cavities of load-bearing columns of the body of a means of transport.

EXAMPLES

Set out below are a number of examples which further illustrate the invention but are in no way intended to restrict the scope of the invention. Unless indicated otherwise, all proportions and percentages are by weight.

Raw materials used for preparing the impact modifier SM 1 and the compositions Ref.1-3 and Ex.1-14 were as follows:

| Raw materials used | Description | Supplier |
|---|---|---|
| HDI | Hexamethylene diisocyanate | Sigma-Aldrich |
| PolyTHF ®2000 | Polytetramethylene ether glycol | BASF |
| Phenol | Phenol | Sigma-Aldrich |
| Dibutyltin dilaurate (DBTL) | Catalyst | Thorson |
| Aerosil R202 | Pyrogenic silica | Evonik |
| Polycal OS325 | Calcium oxide | Fitz Chem Corp. |
| Winnofil SPT | Calcium carbonate | Solvay |
| TRACEL ® OBSH | Oxybisbenzenesulfonyl hydrazide (Blowing agent H) | Tramaco |
| Dicyandiamide | Dicyandiamide (Hardener B) | Sigma-Aldrich |
| N,N-Dimethylurea | (Accelerator C) | Sigma-Aldrich |
| Araldite GY 250 | Bisphenol A-based liquid epoxy resin (liquid epoxy resin A) | Huntsman |
| HyPox RA840 | Epoxide-terminated acrylonitrile/butadiene copolymer liquid at RT | Emerald Performance Materials LLC |
| HyPox RK84L | Epoxide-terminated acrylonitrile/butadiene copolymer liquid at RT | Emerald Performance Materials LLC |

Preparation of the Impact Modifier (SM1)

300.0 g of PolyTHF®2000 (BASF) and 56.7 g of hexamethylene diisocyanate (HDI) were mixed together with 0.04 g of dibutyltin dilaurate (DBTL) in a vessel. After mixing had taken place under reduced pressure at 60° C. for 2 hours, an NCO content of 4.1% was measured. The NCO-terminated polyurethane polymer thus formed was admixed with 39.3 g of phenol (Aldrich), stirred further under reduced pressure at 100° C. for 3 hours and stored at 70° C. for 12 hours. Thereafter the NCO content measured was 0%

Determination of the Isocyanate Content

The isocyanate content in weight % was determined by back-titration using di-n-butylamine employed in excess and 0.1 M hydrochloric acid. All of the determinations were performed semi-manually on a Mettler-Toledo DL 50 Graphix titrator with automatic potentiometric endpoint determination. For this purpose, 600-800 mg of the particular sample were dissolved in each case with heating in a mixture of 10 ml of isopropanol and 40 ml of xylene, and then reacted with a solution of dibutylamine in xylene. Excess di-n-butylamine was titrated with 0.1 M hydrochloric acid, and from this the isocyanate content was calculated.

The respective compositions Ref.1-3 and also Ex.1-14 were mixed in a batch size of 300 g on a planetary mixer and then pressed into sheet-like structures between silicone release films. Immediately after bringing the compositions Ref.1-3 and also Ex.1-14 the sheet-like form, the below mentioned properties (LSS LV, LSS HB and the viscosity) were determined in accordance with the test methods below.

Lap Shear Strength (LSS) (DIN EN 1465)

Cleaned metal test panels measuring 100×25 mm and made from hot-dip galvanized steel (0.8 mm thick) were bonded to an adhesive surface of 12×25 mm using 1 mm thick Teflon spacers in a layer thickness of 1 mm with the compositions described, and full curing took place under the specified curing conditions:

Curing conditions LB (low bake): 10 min at 170° C. oven temperature

Curing conditions HB (high bake): 30 min at 205° C. oven temperature

The lap shear strength was determined on a tensile machine with a pulling speed of 10 mm/min in a 5-fold determination in accordance with DIN EN 1465. The results of these tests are compiled in tables 2 and 4, respectively.

Determination of the Viscosity

The viscosity was measured oscillographically by means of a rheometer having a heatable plate (MCR 201, Anton-Paar) (gap 1000 μm, measuring plate diameter: 25 mm (plate/plate), deformation 0.01 at 5 Hz, temperature: 80° C., heating rate 10° C./min).

The results of these tests are compiled in tables 2 and 4, respectively.

The viscosity of all the compositions was between 8 000-16 000 Pa·s at 30° C. All compositions at room temperature had a surface tack such that after the surface of a sample with an intrinsic weight of 50 g had been pressed with a thumb, exerting a pressure of 5 kg for 1 second, said sample could be lifted up for at least 5 seconds.

The compositions of Ref.1-3 and also Ex.1-6 are set out in tables 1 and 2. Thus, for example, the composition Ref.1 consists both of the components in table 1 listed under "Ref.1", and also of the components of table 2 listed under "Ref.1". The measured properties (LSS LB, LSS HB and viscosity) are evident from table 2.

The compositions of Ex.7-14 are set out in tables 3 and 4. Thus, for example, the composition Ex.7 consists of the components in table 3 listed under "Ex.7-14", and also of the components in table 4 listed under "Ex. 7".

The properties measured (LSS LB, LSS HB and viscosity) are evident from table 4.

As a further comparative example of the state of the art, the viscosity of the examples 1 and 2 in table 3 from EP 1916269 A1 was measured according to the method mentioned before. Example 1 as well as example 2 shows a viscosity at 30° C. of less than 3 000 Pa·s and a viscosity at 80° C. of less than 600 Pa·s.

TABLE 1

| Raw materials used | Ref. 1 (wt %) | Ref. 2, Ref. 3, Ex. 1-Ex. 6 (wt %) |
|---|---|---|
| Aerosil R202 | 6.23% | 5.00% |
| Polycal OS325 | 3.11% | 2.50% |
| Winnofil SPT | 44.82% | 36.00% |
| OBSH (Blowing agent H) | 0.12% | 0.10% |
| Dicyandiamide (Hardener B) | 3.98% | 3.20% |
| N,N-Dimethylurea (Accelerator C) | 0.25% | 0.20% |

TABLE 2

| | Ref. 1 (wt %) | Ref. 2 (wt %) | Ref. 3 (wt %) | Ex. 1 (wt %) | Ex. 2 (wt %) | Ex. 3 (wt %) | Ex. 4 (wt %) | Ex. 5 (wt %) | Ex. 6 (wt %) |
|---|---|---|---|---|---|---|---|---|---|
| Raw materials used | | | | | | | | | |
| SM1 (Impact modifier D) | 9.86% | 12.12% | 7.60% | 7.50% | 12.00% | 10.93% | 7.50% | 8.36% | 8.00% |
| Araldite GY 250 (Liquid epoxy resin A) | 7.50% | 15.00% | 15.49% | 20.00% | 20.00% | 17.96% | 19.50% | 17.5% | 20.00% |

TABLE 2-continued

|  | Ref. 1 (wt %) | Ref. 2 (wt %) | Ref. 3 (wt %) | Ex. 1 (wt %) | Ex. 2 (wt %) | Ex. 3 (wt %) | Ex. 4 (wt %) | Ex. 5 (wt %) | Ex. 6 (wt %) |
|---|---|---|---|---|---|---|---|---|---|
| HyPox RA840 (Copolymer F liquid at RT) | 12.00% | 5.88% | 9.91% | 7.55% | 5.00% | 8.05% | 10.00% | 9.58% | 5.00% |
| HyPox RK84L (Copolymer G solid at RT) | 12.12% | 20.00% | 20.00% | 17.96% | 16.00% | 16.07% | 16.00% | 17.75% | 20.00% |
| Measurement values |  |  |  |  |  |  |  |  |  |
| LSS LB [MPa] | 5.87 | 6.881 | 7.387 | 8.101 | 8.125 | 8.126 | 7.95 | 8.151 | 7.811 |
| LSS HB [MPa] | 5.577 | 6.013 | 5.652 | 6.903 | 6.794 | 6.573 | 6.478 | 6.553 | 7.147 |
| Viscosity at 80° C. [Pa·s] | 5354 | 2609 | 2661 | 2268 | 1668 | 1956 | 2540 | 2540 | 2555 |

TABLE 3

| Raw materials used | Ex. 7-14 (wt %) |
|---|---|
| SM1 (Impact modifier D) | 10.96% |
| Araldite GY 250 (Liquid epoxy resin A) | 20.00% |
| HyPox RA840 (Copolymer F liquid at RT) | 5.65% |
| HyPox RK84L (Copolymer G solid at RT) | 16.39% |
| Aerosil R202 | 6.41% |
| Polycal OS325 | 2.50% |
| Winnofil SPT | 34.59% |

TABLE 4

|  | Ex. 7 (wt %) | Ex. 8 (wt %) | Ex. 9 (wt %) | Ex. 10 (wt %) | Ex. 11 (wt %) | Ex. 12 (wt %) | Ex. 13 (wt %) | Ex. 14 (wt %) |
|---|---|---|---|---|---|---|---|---|
| Starting products |  |  |  |  |  |  |  |  |
| OBSH (Blowing agent H) | 0.01% | 0.01% | 0.01% | 0.01% | 0.25% | 0.25% | 0.25% | 0.25% |
| Dicyandiamide (Hardener B) | 3.48% | 3.36% | 3.23% | 2.99% | 3.24% | 3.12% | 2.98% | 2.75% |
| N,N-Dimethylurea (Accelerator C) | 0.01% | 0.13% | 0.26% | 0.50% | 0.01% | 0.13% | 0.27% | 0.50% |
| Measurement values |  |  |  |  |  |  |  |  |
| LSS LB [MPa] | 8.1 | 6.9 | 7.3 | 7.6 | 8.0 | 7.5 | 8.2 | 7.9 |
| LSS HB [MPa] | 6.9 | 6.0 | 5.1 | 7.5 | 6.8 | 5.5 | 6.1 | 7.2 |
| Viscosity at 80° C. [Pa·s] | 3402 | 3610 | 2860 | 3756 | 3155 | 2636 | 2690 | 3749 |

The invention claimed is:

1. A thermosetting epoxy resin composition comprising from 17.5 to 30 weight % of at least one liquid epoxy resin A having on average more than one epoxide group per molecule;
from 1 to 5 weight % of at least one hardener B for epoxy resins which is activated by elevated temperature;
from 0 to 2 weight % of at least one accelerator C;
from 5 to 12 weight %, of at least one polymeric impact modifier D, which is a terminally blocked polyurethane prepolymer;
from 1 to 5 weight % of at least one polyisoprene E;
from 5 to 10 weight % of at least one carboxyl- or epoxide- terminated acrylonitrile/butadiene copolymer F which is liquid at room temperature;
from 15 to 20 weight % of at least one carboxyl- or epoxide- terminated acrylonitrile/butadiene copolymer G which is solid at room temperature;
based on a total weight of the epoxy resin composition.

2. The thermosetting epoxy resin composition according to claim 1, further comprising at least one physical or chemical blowing agent H in an amount of from 0.1 to 3 weight %, based on the total weight of the epoxy resin composition.

3. A structural foam obtained by heating the thermosetting epoxy resin composition according to claim 2.

4. The thermosetting epoxy resin composition according to claim 1, wherein the thermosetting epoxy resin composition is tacky at room temperature.

5. The thermosetting epoxy resin composition according to claim 1, wherein the thermosetting epoxy resin composition has a viscosity at 80° C. in a range of from 900 to 5 000 Pa·s, the viscosity being determined oscillographically by a rheometer with heatable plate (MCR 201, Anton Paar) (1000 μm gap, measurement plate diameter: 25 mm (plate/plate), deformation 0.01 at 5 Hz, temperature: 80° C.).

6. The thermosetting epoxy resin composition according to claim 1, wherein the thermosetting epoxy resin composition has a viscosity at 30° C. in a range of from 5 000 to 50 000 Pa·s, the viscosity being determined oscillographically by a rheometer with heatable plate (MCR 201, Anton Paar) (1000 μm gap, measurement plate diameter: 25 mm (plate/plate), deformation 0.01 at 5 Hz, temperature: 30° C.).

7. The thermosetting epoxy resin composition according to claim 1, wherein the at least one accelerator C comprises at least one substituted urea selected from the group consisting of 3-(3-chloro-4-methylphenyl)-1,1-dimethylurea (chlortoluron), p-chlorophenyl-N,N-dimethylurea (monuron), 3-phenyl-1,1-dimethylurea (fenuron), 3,4-dichlorophenyl-N,N-dimethylurea (diuron), N,N-dimethylurea, N-isobutyl-N',N'-dimethylurea, and 1,1'-(hexane-1,6-diyl)bis(3,3'-dimethylurea).

8. The thermosetting epoxy resin composition according to claim 1, comprising from 0.3 to 0.5 weight % of the at least one accelerator C.

9. The thermosetting epoxy resin composition according to claim 1, wherein the at least one impact modifier D is a terminally blocked polyurethane prepolymer represented by formula (I);

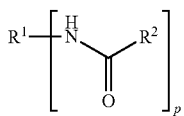

(I)

where R¹ is a p-valent residue of a linear or branched polyurethane prepolymer PU1, terminated with isocyanate groups, following the removal of the terminal isocyanate groups;

p is from 2 to 8; and

R independently at each occurrence is a substituent selected from the group consisting of

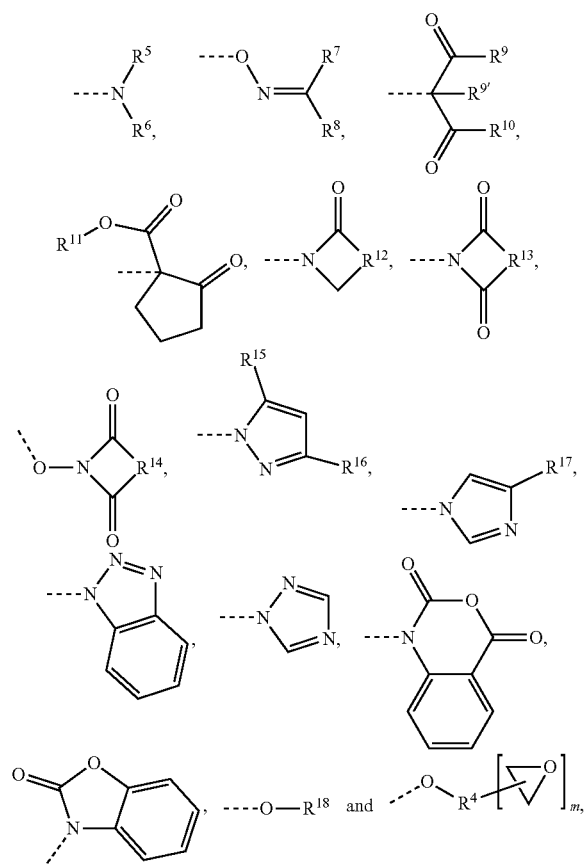

where

R⁵, R⁶, R⁷ and R⁸ each independently of one another are an alkyl or cycloalkyl or aralkyl or arylalkyl group, or R⁵ together with R⁶, or R⁷ together with R⁸, form part of a 4- to 7-membered ring which is optionally substituted;

R⁹, R⁹' and R¹⁰° each independently of one another are an alkyl or aralkyl or arylalkyl group or are an alkyloxy or aryloxy or aralkyloxy group;

R¹¹ is an alkyl group,

R¹², R¹³ and R¹⁴ each independently of one another are an alkylene group having 2 to 5 C atoms which optionally has double bonds or is optionally substituted, or are a phenylene group or are a hydrogenated phenylene group;

R¹⁵, R¹⁶ and R¹⁷ each independently of one another are H or are an alkyl group or are an aryl group or an aralkyl group; and R¹⁸ is an aralkyl group or is a mono- or polycyclic, substituted or unsubstituted aromatic group which optionally has aromatic hydroxyl groups;

R⁴ is a residue of an aliphatic, cycloaliphatic, aromatic or araliphatic epoxide containing a primary or secondary hydroxyl group, after the removal of the hydroxyl and epoxide groups;

and m is 1, 2, or 3.

10. The thermosetting epoxy resin composition according to claim 1, wherein the at least one polyisoprene E is a polyisoprene which is liquid at room temperature.

11. The thermosetting epoxy resin composition according to claim 1, comprising from 1 to 3 weight % of the at least one polyisoprene E.

12. The thermosetting epoxy resin composition according to claim 1, wherein the at least one carboxyl- or epoxide-terminated acrylonitrile/butadiene copolymer F which is liquid at room temperature is an epoxide-terminated acrylonitrile/butadiene copolymer having an elastomer fraction of from 35 to 45 weight %.

13. The thermosetting epoxy resin composition according to claim 1, wherein the at least one carboxyl- or epoxide-terminated acrylonitrile/butadiene copolymer G which is solid at room temperature is an epoxide-terminated acrylonitrile/butadiene copolymer having an elastomer fraction of from 25 to 35 weight %.

14. The thermosetting epoxy resin composition according to claim 1, comprising from 16 to 20 weight % of the at least one carboxyl- or epoxide-terminated acrylonitrile/butadiene copolymer G.

15. The thermosetting epoxy resin composition according to claim 1, wherein the at least one carboxyl- or epoxide-terminated acrylonitrile/butadiene copolymer G is an epoxide-terminated acrylonitrile/butadiene copolymer that is a reaction product of at least one acrylonitrile/butadiene copolymer and a solid epoxy resin that is bisphenol A-based solid resin, bisphenol F-based solid resin, or both.

16. An article having a three-dimensional extent comprising the thermosetting epoxy resin composition according to claim 1.

17. A method for reinforcing outer surfaces or hollow cavities of structural components, comprising the steps of
   i) placing the thermosetting epoxy resin composition according to claim 1 onto outer surfaces or into cavities of structural components;
   ii) heating the thermosetting epoxy resin composition to a temperature of 100-220° C.

18. A reinforced article obtained from the method according to claim 17.

19. A method for reinforcing heat-stable materials, comprising the steps of
   i) placing the thermosetting epoxy resin composition according to claim 1 onto heat-stable materials;
   ii) heating the thermosetting epoxy resin composition to a temperature of 100-220° C.

20. A fully cured epoxy resin composition obtained by heating a thermosetting epoxy resin composition according to claim 1 to a temperature of 100-220° C.

* * * * *